(12) United States Patent
Rosenberg et al.

(10) Patent No.: US 7,583,617 B2
(45) Date of Patent: Sep. 1, 2009

(54) METHOD FOR BUILDING VIRTUAL PRIVATE NETWORKS USING ROUTERS

(75) Inventors: Eric Rosenberg, Lincroft, NJ (US); James Uttaro, Staten Island, NY (US)

(73) Assignee: AT&T Corp., New York, NY (US)

( * ) Notice: Subject to any disclaimer, the term of this patent is extended or adjusted under 35 U.S.C. 154(b) by 599 days.

(21) Appl. No.: 11/135,820

(22) Filed: May 24, 2005

(65) Prior Publication Data
US 2006/0268740 A1    Nov. 30, 2006

(51) Int. Cl.
*H04L 12/28* (2006.01)
*H04L 12/56* (2006.01)
*H04J 1/16* (2006.01)
*G06F 15/173* (2006.01)
*G06F 15/16* (2006.01)

(52) U.S. Cl. .................. 370/254; 370/252; 370/395.53; 709/225; 709/226; 709/229

(58) Field of Classification Search .................. 370/254
See application file for complete search history.

(56) References Cited

U.S. PATENT DOCUMENTS

| | | | | |
|---|---|---|---|---|
| 5,802,286 | A * | 9/1998 | Dere et al. | 709/220 |
| 6,119,143 | A * | 9/2000 | Dias et al. | 709/201 |
| 6,226,751 | B1 * | 5/2001 | Arrow et al. | 726/15 |
| 6,252,858 | B1 * | 6/2001 | Inoue | 370/254 |
| 6,883,154 | B2 | 4/2005 | Teig | 716/7 |
| 7,284,067 | B2 * | 10/2007 | Leigh | 709/238 |
| 2004/0004939 | A1 * | 1/2004 | Yegenoglu | 370/252 |
| 2004/0004968 | A1 | 1/2004 | Nassar | 709/230 |
| 2004/0073640 | A1 * | 4/2004 | Martin et al. | 709/223 |
| 2004/0221051 | A1 | 11/2004 | Liong | 709/230 |
| 2006/0182037 | A1 * | 8/2006 | Chen et al. | 370/252 |

(Continued)

FOREIGN PATENT DOCUMENTS

WO    WO-02/19056 A2    3/2002

OTHER PUBLICATIONS

Nieh, Jason; Vaill, Chris; Zhong, Hua; Virtual-Time Round-Robin: An O(1) Proportional Share Scheduler; Proceedings of the 2001 USENIX Annual Technical Conference, Jun. 2001, pp. 1-15.*

(Continued)

*Primary Examiner*—Daniel J Ryman
*Assistant Examiner*—Cassandra Decker

(57) ABSTRACT

A method for forming a communications network using routers. The first step is analyzing a router location to determine if the router location is VPN resource constrained or interface-constrained. The VPN resource constrained router network comprises at least at least two groups of routers and the same number of customer groups. The next step is connecting the first group of customers and routers, and the second group of customers and routers, using a round robin connectivity methodology and saving information in each router's database. The interface-constrained router network, comprises no more routers than the value [Q*], wherein [Q*] represents the number of routers that can be used by a group of customers so that VPN resources will not be exhausted faster than interface resources for the group of routers, then connecting customers to the group of routers using a round robin connectivity methodology and saving information in each router's database.

8 Claims, 7 Drawing Sheets

U.S. PATENT DOCUMENTS

2007/0214412 A1* 9/2007 Arquie et al. ............... 715/526

OTHER PUBLICATIONS

Vitter, Jeffrey Scott and Hutchinson, David Alexander; "Distribution Sort with Randomized Cycling"; Journal of teh ACM, vol. 53, No. 4, Jul. 2006, pp. 656-680 (provided in lieu of the original publication of the article in the Proceedings of the 12th Annual SIAM/ACM Symposium on Discrete Algorithms, ACM, 2001, pp. 77-86).*

Vitter, Jeffrey Scott and Hutchinson, David Alexander; "Distribution Sort with Randomized Cycling"; Journal of the ACM, vol. 53, No. 4, Jul. 2006, pp. 656-680 (provided in lieu of the original publication of the article in the Proceedings of the 12th Annual SIAM/ACM Symposium on Discrete Algorithms, ACM, 2001, pp. 77-86).*

European Search Report for EP Application No. 06 11 4144; copy consists of 8 unnumbered pages.

* cited by examiner

METHOD FOR BUILDING VIRTUAL PRIVATE NETWORKS USING ROUTERS

FIELD

The present embodiments relate generally to building virtual private networks using the minimal number of routers while providing the maximum level of redundancy.

BACKGROUND

In Virtual Private Networks (VPNs), customer premise equipment (CPE) is connected to a router. In a given city, a customer might request multiple connections (interfaces or ports) on a router. If all the ports for a particular customer are assigned to a single router and the router fails, all the ports for the customer are down until the failure is cleared. This "exposure" of a single customer is reduced if the customer's ports are assigned to multiple routers. However, this creates another problem, since the full set of routes used by the customer must be stored on each router the customer's ports are assigned to. This can lead to inefficient use of router resources (e.g., early router exhaustion due to insufficient memory), and increases the number of routers required for the customer virtual private network. The problem therefore is how to minimize the impact of a router failure without purchasing more routers.

The virtual private network business is growing very rapidly, and customers are very concerned about router failure affecting service. The ability to minimize a customer's exposure to a router failure without additional cost to the customer and the service provider is a big selling point. A typical Cisco router costs about $300,000 to install and embodiments of this invention could save 1 router per location. If a service provider has 50 locations that is a savings of $15 Million.

The present embodiments solve these problems.

SUMMARY

An embodiment of the invention can be for a method of forming a communications network using routers. A step in the method can be to analyze a router location to determine if the router location is VPN resource constrained or interface constrained.

If the router location is VPN resource constrained, the next step is forming a VPN constrained router network. The steps of forming the VPN resource constrained router network can comprise creating at least a first group of routers and a second group of routers, and wherein the quantity of routers in each group of routers is equal or nearly equal. The network can also include at least a first group of customers and a second group of customers, wherein the quantity of customers in each group of customers is equal or nearly equal, and wherein the number of groups of customers is equal to the number of groups of routers. Connecting the first group of customers to the first group of routers, and the second group of customers to the second group of routers, using a round robin connectivity methodology, is a step to the method. The step of connecting additional groups of customers to additional groups of routers can be repeated. The next step can be saving information in a database on each connected customer.

If the router location is interface constrained, a step of the method can be forming an interface constrained router network. The interface constrained router network can comprise a group of routers numbering not more than $[Q^*]$. The value $[Q^*]$ represents the maximum number of routers that can be used by a defined group of customers, using a round robin connectivity methodology, so that VPN resources will not be exhausted faster than interface resource for the group of routers. The next step in forming the interface constrained router network can be distributing customer connections for the defined group of customers over a group of at most $[Q^*]$ routers using a round robin connectivity methodology. Another step can be saving information in a database on each connected customer.

While these embodiments have been described with emphasis on the embodiments, it should be understood that within the scope of the appended claims, the embodiments might be practiced other than as specifically described herein.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

The embodiments of the current invention are for a method of minimizing the impact to a customer created by a router failure without increasing the number of routers, and without increasing the costs incurred by a customer or a service provider. The embodiments of the invention can be a method for determining if one of two resource classes is scarce and can reduce the number of necessary routers and/or create a more reliable network depending on which resource is scarce.

By minimizing the impact of router failures on customers such as pharmacies, the embodiments of the current application can save lives. Most pharmacies use a virtual private network, and a failure of the virtual private network can result in a delay or total inability of a pharmacy to refill a customer's prescription.

By minimizing the impact of router failures on customers such as an oil companies, the embodiments of the current application helps prevent environmental catastrophes by creating a more reliable network to run their pipeline monitoring systems.

The invention is based upon a router consuming two types of resources. The first resource is a per-interface resource, such as ports, Border Gateway Protocol (BGP) sessions or bandwidth. The second resource is a per-virtual private network resource such as memory or routes.

Figure 1:
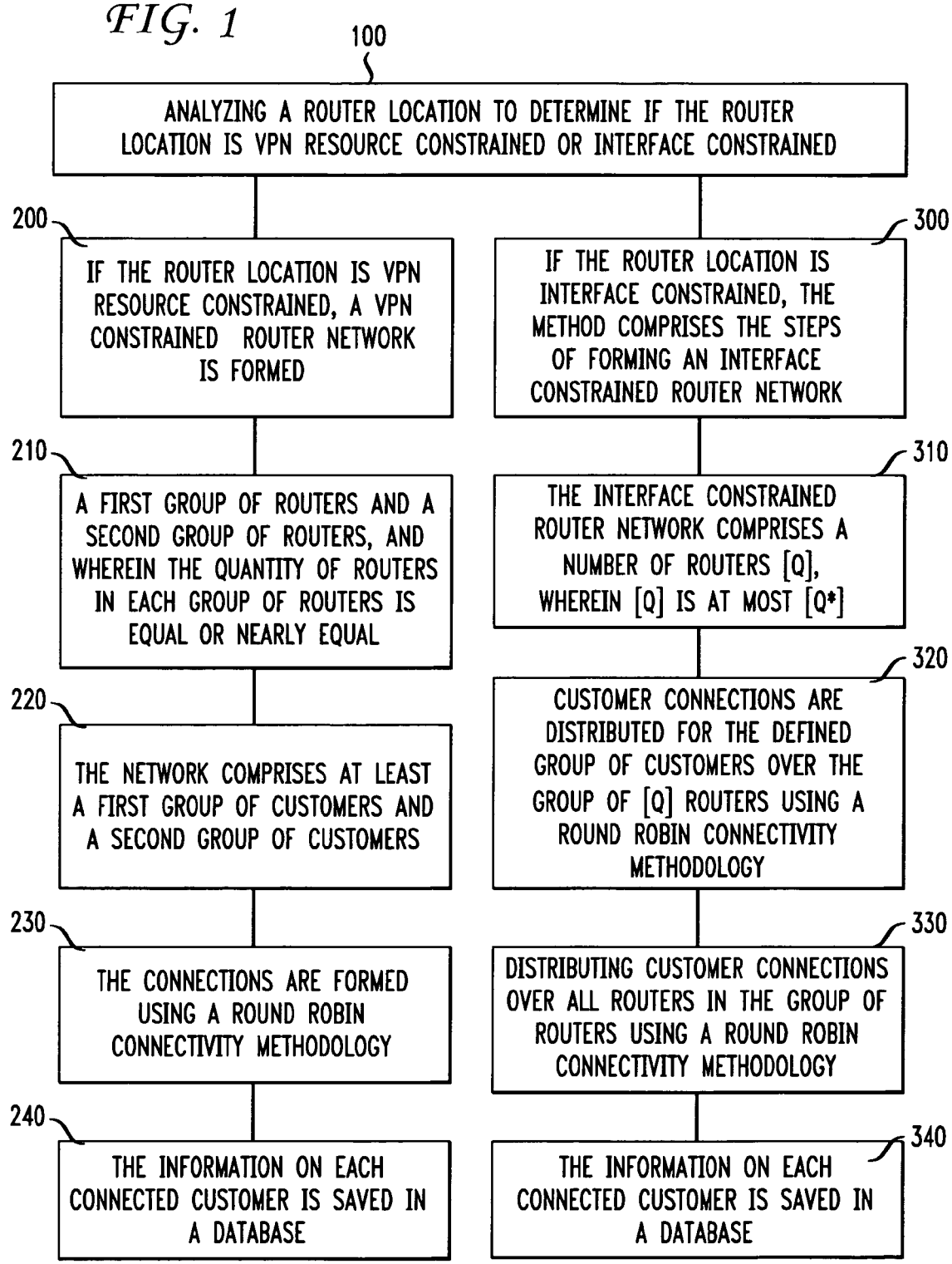
FIG. 1 depicts a flow chart of an embodiment of the method.

With reference to the figures, FIG. 1 depicts a flow chart of an embodiment of the method for both the interface constrained network and the VPN constrained network.

An embodiment of the method can be for enhancing the reliability of a communications network using routers. The first step can be analyzing a router location to determine if the router location is VPN resource constrained or interface constrained [100]. A router network is built based on the analysis.

The step of analyzing can comprise determining an average number [P] of interfaces, averaged over a plurality of customers, needed to operate a virtual private network for a customer at the router location. After that, the step of analyzing can comprise determining a quantity [B] of interfaces available on a router at the router location. The next step can be determining an average amount [F] of VPN resource, averaged over the plurality of customers, needed to operate the virtual private network for the customer at the router location. The analyzing continues by determining an amount [R] of VPN resource available on the router. This amount can be determined by the specifications of the router.

The next step is forming an interface ratio [IR] by dividing [B] by [P] and forming a VPN resource ratio [VR] by dividing [R] by [F]. If [IR] is greater than [VR], then a VPN constrained router network is formed. If [VR] is greater than [IR] then an interface constrained router network is formed. The step of analyzing the network can be done in ways other that those described.

Any time a port for a given customer is connected to a router, the entire routing table or set of routes must be stored in a database on the router. The storage is limited by the amount [R] of VPN resource available on the router. If a second port for a customer is added to the same router as the first port, the routing table does not need to be stored again.

The step of analyzing a router location can be repeated for additional router locations that are used by the customer.

I. Creating a VPN Constrained Embodiment of a Network.

If the router location is VPN resource constrained, a VPN constrained router network is formed [200]. The VPN constrained router network comprises at least a first group of routers and a second group of routers, and wherein the quantity of routers in each group of routers is equal or nearly equal [210]. The network also comprises at least a first group of customers and a second group of customers [220]. The quantity of customers in each group of customers is equal or nearly equal, and wherein the number of groups of customers is equal to the number of groups of routers. Nearly equal means that the quantity differs by a small number such as one or two. After the groups are formed, the first group of customers is connected to the first group of routers, and the second group of customers is connected to the second group of routers. The connections are formed using a round robin connectivity methodology [230]. If needed, additional groups of customers are connected to additional groups of routers. The information on each connected customer is saved in a database [240].

II. Creating the Interface Constrained Embodiments of a Network.

The embodiments of the current invention propose a way to round robin connect the ports for an interface constrained network among a set number of routers. The set number of routers is a number that can be calculated based upon the customer's requirements and the router technology.

If the router location is interface constrained, the method comprises the steps of forming an interface constrained router network [300]. The interface constrained router network comprises a number of routers [Q], wherein [Q] is at most [Q*] [310]. The value of [Q*] represents the maximum number of routers that can be used by a defined group of customers so that VPN resources will not be exhausted faster than interface resources for the routers. Customer interfaces are distributed for the defined group of customers over [Q] routers using a round robin connectivity methodology [320]. After that, information on each connected customer is saved in a database [330].

The value of [Q*] can be determined by dividing a quantity [R] of VPN resources available from a router by an average amount [F] of VPN resource averaged over the defined group of customers, forming a value [VR]. A quantity [B] of interfaces available on a router in the group of routers is divided by an average number [P] of interfaces averaged over the defined group of customers forming [IR], and then [VR] is divided by [IR]; thus [Q*] equals [VR] divided by [IR]. The formula is $Q^* = (R/F)/(B/P)$. Using the equation, the load can be balanced among up to [Q*] routers without adding additional routers at additional cost, if [Q*] is not a interger [Q*] can be rounded down to the next integer. Load balancing among fewer than Q* routers means that the virtual private network is not providing the maximum possible protection against a router failure. Load balancing among more than Q* routers means we need more routers than are required, based on the number of interfaces that are needed.

A router's interface capacity can be limited by the number [B] of ports, BGP sessions or policy maps a router can support. A router's virtual private network capacity can be limited by the quantity [R] of memory or the quantity of routes that the router can support.

III. Examples of an Interface Constrained Router Network.

Figure 2:
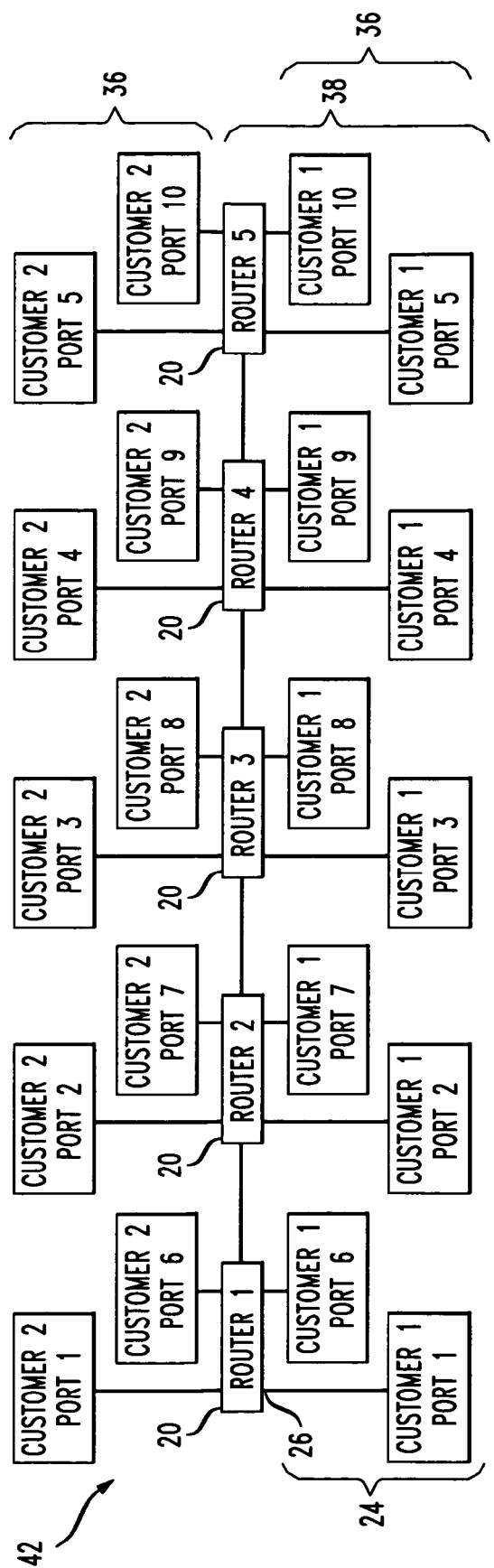
FIG. 2 depicts an example of an interface constrained network created using this method.

FIG. 2 depicts an example of an interface constrained network (42) constructed using the method. To apply the method some information about existing customers at the location and the capabilities of routers at the location is required. For this example the method was applied to the following information and the result is the network depicted in FIG. 2. The average number [P] of interfaces for a virtual private network in an office is 10 and the average amount [F] of VPN resource for a Virtual private network is 500. In addition, the total amount [R] of routes available on a router is 75,000 and the number [B] of interfaces available on the router is 300. For most routers, [B] is actually determined by the number of BGP sessions the router supports, and not by the router bandwidth or the number of logical ports available.

The average number of interfaces for a customer virtual private network in a location can be determined by using existing customer data at the router location. Additionally, determining an average number of routes for a customer VPN in a location can be determined by using existing customer data at the router location. The average number of interfaces [P] needed by a customer in a location can be from about 1 to about 50 interfaces. The average amount of VPN resource needed for a customer to operate the virtual private network can be from about 10 to about 10,000 routes.

A plurality of customers (36) can use the interface constrained network (42). As an example, two customers are shown in the figure. Customer 1 has ten interfaces and customer 2 has nine customer interfaces. The first interface for customer 1 (24) is connected to Router 1 (26).

A virtual private network (38) is formed for each customer by interconnecting a plurality of routers. The interconnection is shown with customer 2's interfaces connected to routers 1 through 5 (20). Customer 2 can create a virtual private network (38) between customer 2's nine interfaces.

By solving the formula, the following results are obtained: (R/F)=150 and (B/P)=30. Since R/F is greater than B/P, the routers in the group are interface constrained.

The maximum number of routers for an interface constrained network can be determined by the formula $Q^* = (PR)/(BF)$, so Q* is the optimal number of routers to take advantage of the available VPN resources, the available interfaces, and create the most reliable network possible. The number of routers used can be less than Q*, but the reliability of the network is reduced because the same amount of interfaces are using fewer routers. For example, a router failure can cause more customers interfaces to fail.

The maximum number of routers Q* for this example is Q*=150/30=5.

The number of virtual private networks that can be supported by a set of Q* routers is 150. Since each virtual private network uses 500 routes, these 300 virtual private networks will consume the full 75,000 routes on each of the Q* routers. The example network fully utilizes the interface capacity and the VPN resource capacity on each router. The reliability can be seen because if a failure of any one of the Q* routers occurs the failure will only effect 2 of a customer's 10 interfaces.

The customer interfaces can be connected to 5 routers as determined by the formula for Q*. The number of interfaces-connected to each router is determined by the formula P/Q*. For customer 1 the formula results in 10/5=2 interfaces per router; for customer 2 the formula results in 9/5=1.8 ports per router. The 1.8 interfaces per router are rounded up to a maximum of 2 interfaces per router and one of the routers only has one of customer 2's interfaces.

The next step is to connect the customers to the routers using the round robin connectivity methodology. The round robin connectivity methodology can mean that a first customer interface is assigned to a first router and a second customer interface for the same customer is assigned to the second router in a group until each of the routers in the group contains one customer interface.

The method proceeds until all of the customer interfaces are connected to a router in the group of routers. The step of connecting the first customer interface to a router can begin at a randomly selected router. For example, the first customer connected to a group of routers can begin the round robin connectivity methodology on router 1, and the second customer connected to a group of routers can begin the round robin connectivity methodology on router 2 or any other router.

A round robin connectivity methodology involves assigning customer interfaces to routers. The difference between a quantity of a customer's interfaces attached to any router in the group of routers and the quantity of interfaces attached to any other router in the group of routers for the customer is less than or equal to one.

If this method were not used, a round robin assignment over Q=10 routers per office will overextend the amount of VPN resources on a router. Since P/Q=10/10=1, each of the Q routers will have I interface from each virtual private network, thus 300 virtual private networks could fit into the Q routers because the number of interfaces available on a router is 300. However, this result is not possible because of the VPN resource capacity since each virtual private network consumes 500 routes and a maximum of only R/F=150 virtual private networks per router can exist per the example. If this network were load balanced over 10 routers, the VPN resource capacity of the router will be completely consumed while only using half the interface capacity of each router.

Figure 3:
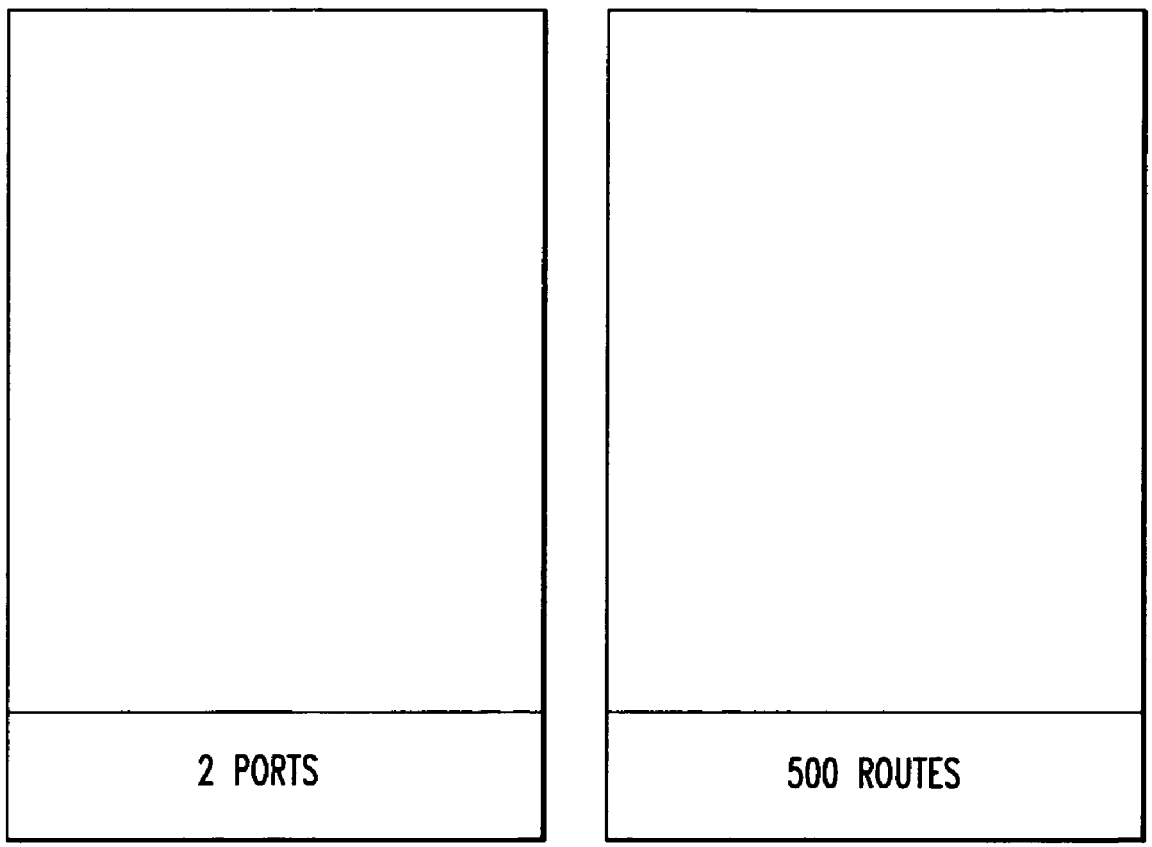
FIG. 3 is a chart.

FIG. 3 depicts a graph of another example of an interface constrained network constructed using the method. For this example, the average number [P] of interfaces for a virtual private network in an office is 20 and the average amount [F] of VPN resources for a Virtual private network is 500. In addition, the total amount [R] of VPN resources available on a router is 150,000 and the number of interfaces [B] available on the router is 600. By solving the formula, the following results are obtained: [R/F]=300 and [B/P]=30. Since R/F is greater than B/P, the routers in the group are interface resource constrained, so the customer's ports can be round robined over at most Q*=300/30=10 routers.

If 10 routers are used, two interfaces per routers are used for each customer. The use of the VPN resources is maximized and a network is created where only two interfaces per customer would be effected by the failure of one router.

Figure 4:
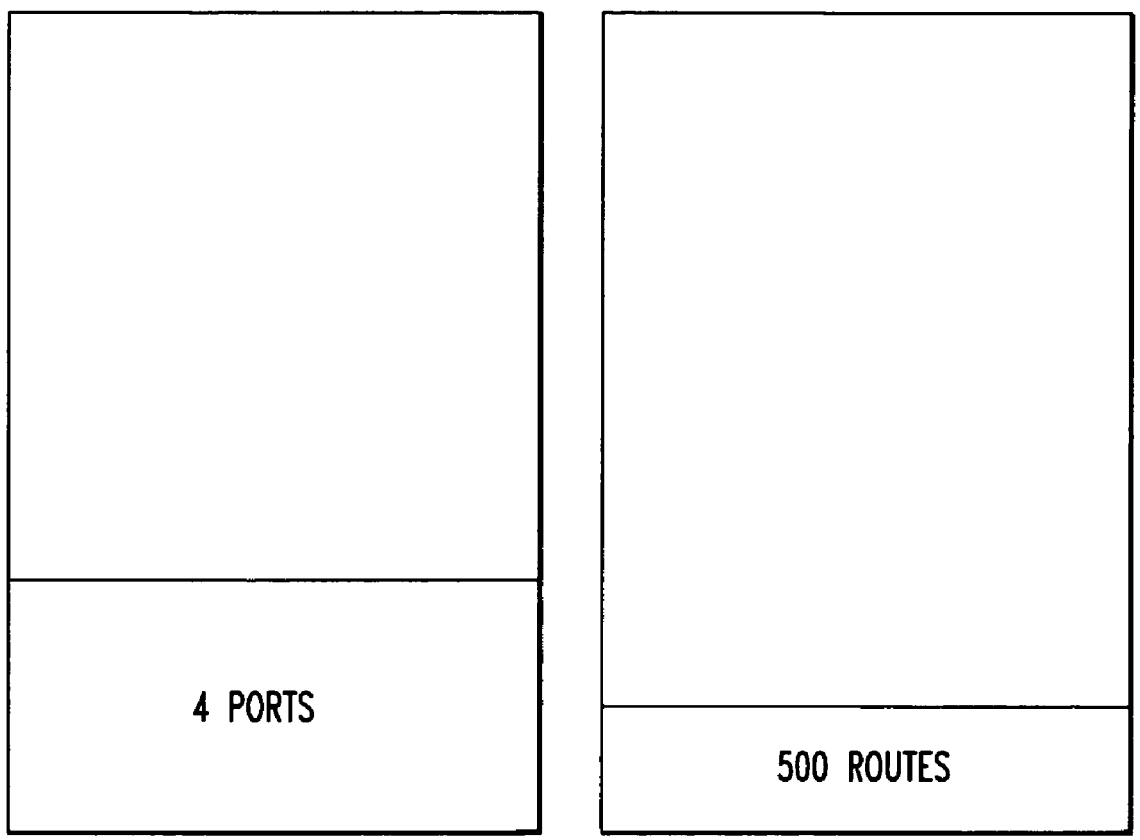
FIG. 4 is a chart.

FIG. 4 depicts a graph of the same network, wherein only 5 routers are used and not the optimum number of 10. If a router fails, four customer ports will fail instead of two ports as seen when using 10 routers.

Figure 5:
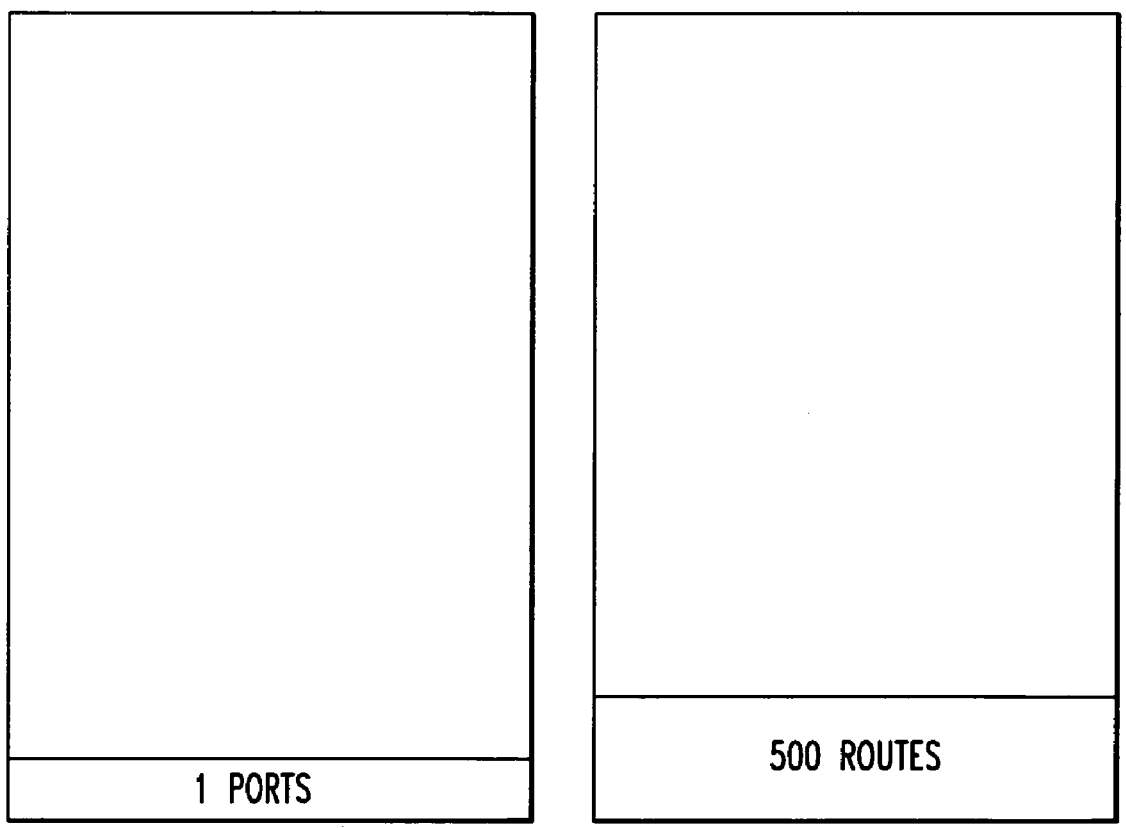
FIG. 5 is a chart.

FIG. 5 depicts a graph of the same network, wherein 20 routers are used, thereby exceeding the optimum number of 10. This network is VPN resources constrained, so that a router cannot store in VPN resources all of the routes possible to the other routers. Each customer will assign its 20 interfaces by assigning one interface to each router since the routing table for each customer is stored on each router, each router can support only 150,000/500=300 customers. The interface capacity of each router is only half used.

IV. Examples of a VPN Constrained Router Network.

Figure 6:
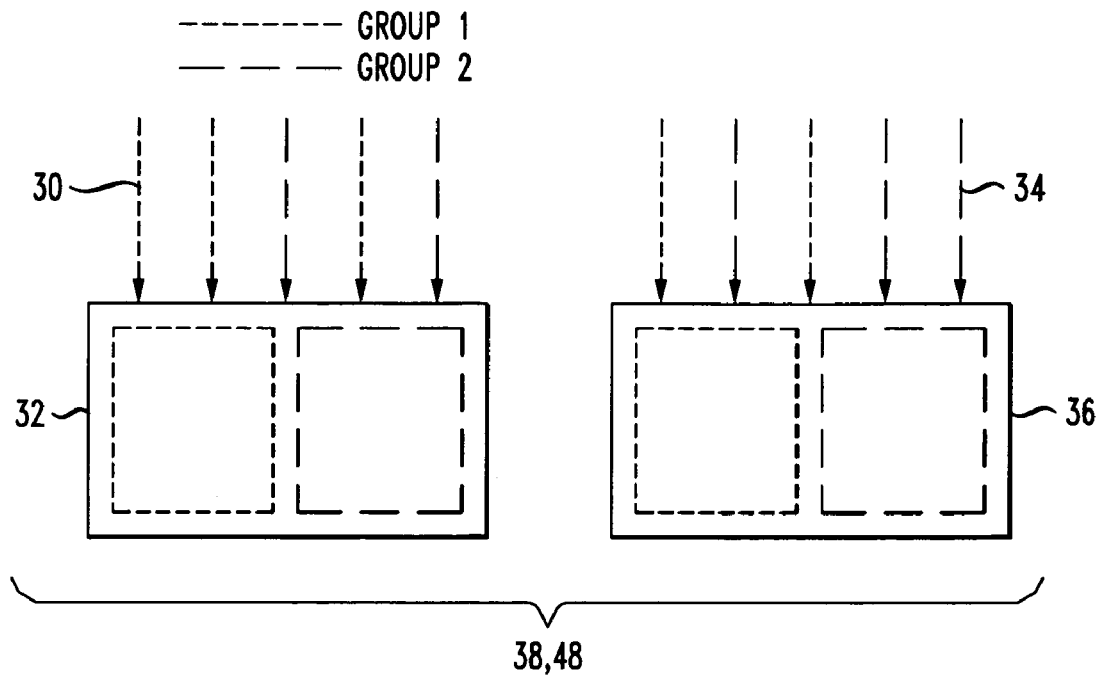
FIG. 6 depicts an example of a virtual private network resource constrained network.

FIG. 6 depicts an example of a VPN constrained router network (48). The network is shown before the method of this invention is applied to the network. The routers (32 and 36) have both customer 1 interfaces (30) and customer 2 interfaces (34). To create a virtual private network (38) for customer 1, both routers (32 and 36) are used. Since each of the routers has an interface from both customer 1 (30) and customer 2 (34), both router 1 (32) and router 2 (36) must store the routes list for customer 1 (33) and the routes list for customer 2 (35) in the memory of the routers (32 and 36). If the networks were very large, this scenario would mean that the ability of routers (32 and 36) to store all of the routes would be exhausted and/or that additional customers cannot be added to the routers because the router would not be able to store the route list of the new customer.

Figure 7:
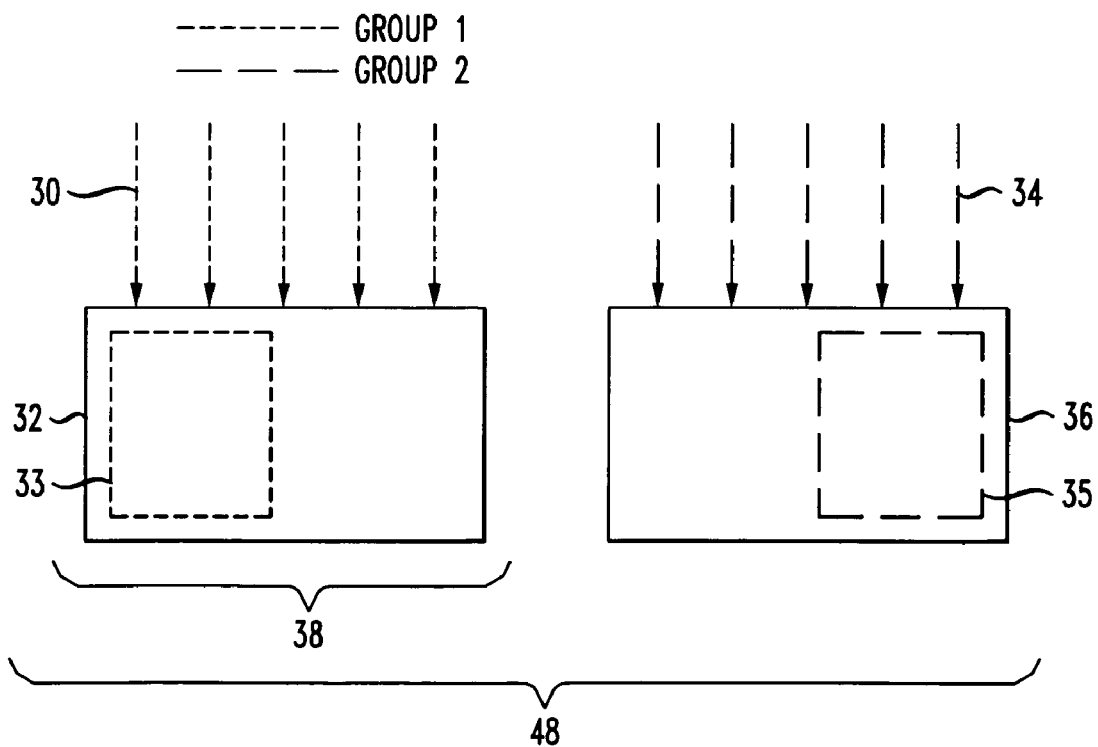
FIG. 7 depicts an example of a virtual private network resource constrained router after applying the method.

FIG. 7 depicts an example of the same VPN constrained router network (48) shown in FIG. 3 after an embodiment of the method has been applied to the network. Assuming the network was determined to be VPN constrained, the next step is creating two groups of routers. In this figure, router 1 (32) can be assigned to a green group and router 2 (36) can be assigned to a blue group. Customer 1 can be assigned to a green group and customer 2 can be assigned to a blue group. Since customer 1 interfaces (30) are all assigned to router 1 (32) and all of customer 2 interfaces (34) are all assigned to router 2 (36), the routers only need to store the routes list for the customers who's interfaces are assigned. This scenario allows customer 1 to create a VPN (38) on router 1 (32). Router 1 (32) stores the routes list for customer 1 (33) and router 2 (36) stores the routes list for customer 2 (35). By freeing up memory in the routers (32 and 36), the routers can now handle more customers because the routers now have the storage space to store the routes list for the new customer. This example is only representative of a VPN constrained network. To provide more redundancy, each group of routers can comprise many routers with the customer's interfaces distributed equally or nearly equally among the routes in the group of routers limiting the effects of a router failure on a customer. The equal distribution of customer interfaces can be performed by round robin connectivity methodology.

When 10 routers and four customers are at the location (10), the 10 routers can be divided into 2 groups of 5. Once the routers at a location are divided into groups, the next step of the method can be dividing the customers into the same number of groups. Customer 1 and customer 3 are assigned to the first group (20) and customer 2 and customer 4 are assigned to the second group (22). If there are an odd number of customers, more customers can assigned to one group of routers than another group of routers. The method works best when an equal or nearly equal of amount of routers exists in each group and about the same number of customer ports assigned to each group. Nearly equal means that for any two groups of routers the quantity of routers in each group should not differ by more than one router.

Another step in the method can be the step of assigning colors, number, letters or another identifier to each group routers. For example, if there are two groups of five routers, the first group of routers (20) can be designated as the green routers and the second group of routers (22) can be designated as the blue routers. Customers are then assigned a corresponding color. For example, customer 1 and customer 3 can be placed in the green group and customer 2 and customer 4 can be placed in the blue group. The green customer's interfaces are then assigned to a router in the green group.

Figure 8:
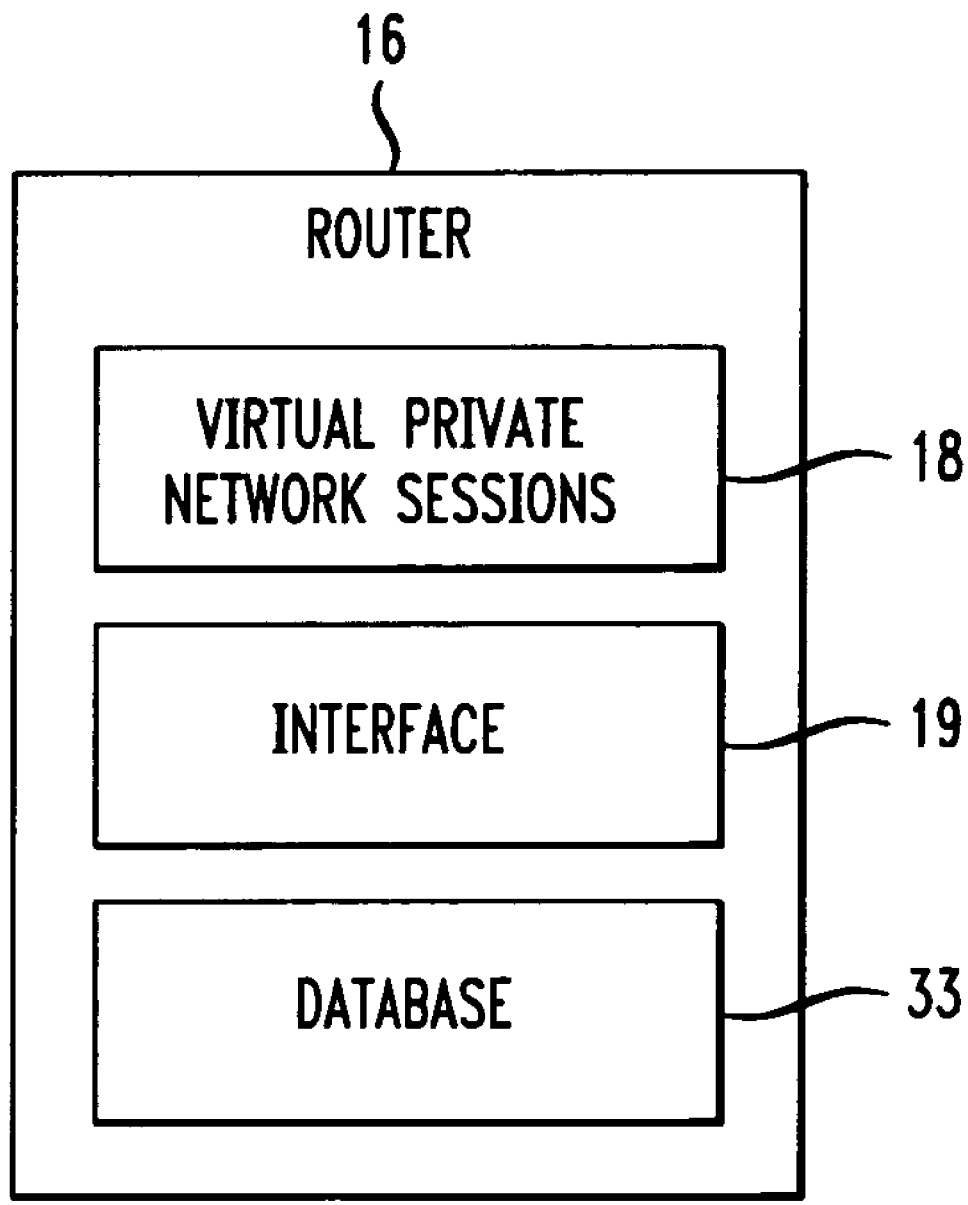
FIG. 8 depicts a router usable in this method.

FIG. 8 depicts a router (16) usable in the invention. The router comprises an amount of VPN resources (18) and interfaces (19). The amount of VPN resources (18) can be used to store all of the possible routes form one of the customers ports to another of the customer's ports. The quantity of interfaces (19) represents the number of connection or sessions that are be available on the router.

V. Examples of a Dynamic Virtual Private Network.

Another embodiment of the method can be for a dynamic virtual private network in which customer ports are provisioned dynamically over time. This embodiment can be used for a growing existing virtual private network. For example, if B=600, P=20, R=150,000 and F=500, then Q*=10 according to the formula. If ten interfaces for a given customer's virtual private network are assigned to routers 1 through 10, and if these 10 routers fill up due to other virtual private networks using the routers, and if all 20 interfaces have not been assigned for the given customer, the given customer's virtual private network will end up using more than 10 routers. For dynamically arriving ports, the first step is to divide the available routers into groups. For example, ten routers can be divided into two groups of five each. Within each of the groups, a round robin connectivity methodology port assignment can be used.

In an embodiment using dynamic arriving ports, the network is implied to be VPN resource constrained unless the interface ratio [IR] is substantially smaller than the VPN resource ratio [VR].

While these embodiments have been described with emphasis on the embodiments, it should be understood that within the scope of the appended claims, the embodiments might be practiced other than as specifically described herein.

PARTS LIST a router location 10
a router 16
VPN resource [aka memory] 18
an interface 19
a first group of routers 20
a second group of routers 22
a customer 24
a first group of customers 30
a database 33
a second group of customers 34
a plurality of customers 36
a virtual private network 38
an interface constrained router network 42
a VPN constrained router network 48
an average number of interfaces [P]
a quantity of interfaces [B]
an interface ratio [IR];
a VPN resource ratio [VR]
a quantity of routers [Q*]

What is claimed is:

1. A method for forming a communications network using routers, the method comprising:
  a. analyzing a router location to determine if the router location is Virtual Private Network (VPN) resource constrained or interface constrained;
  b. if the router location is interface constrained, forming an interface constrained router network, comprising:
    i. a group of routers numbering at most [Q*] wherein [Q*] represents a number of routers that is used by a defined group of customers so that VPN resources will not be exhausted faster than interface resources for the group of routers, wherein [Q*] is determined by dividing a quantity of VPN resources available from a router [R] by an average amount of VPN resources averaged over a defined group of customers [F] forming a value [VR], and then dividing a quantity of interfaces available from a router in a group of routers [B] by an average number of interfaces[P] averaged over the defined group of customers forming [IR], and then dividing [VR] by [IR], where [Q*] equals [VR] divided by [IR];
    ii. distributing customer connections for the defined group of customers over the group of routers numbering at most [Q*] using a round robin connectivity methodology; and
    iii. saving in a database information on each connected customer; and
  c. if the router location is not interface constrained, forming a VPN resource constrained router network.

2. A method for forming a communications network using routers, the method comprising:
  a. analyzing a router location to determine if the router location is Virtual Private Network (VPN) resource constrained or interface constrained;
  b. if the router location is interface constrained, forming an interface constrained router network, comprising:
    i. a group of routers numbering at most [Q*] wherein [Q*] represents a number of routers that is used by a defined group of customers so that VPN resources will not be exhausted faster than interface resources for the group of routers;
    ii. distributing customer connections for the defined group of customers over the group of routers numbering at most [Q*] using a round robin connectivity methodology; and
    iii. saving in a database information on each connected customer; and
  c. if the router location is not interface constrained, forming a VPN resource constrained router network,
    wherein the analyzing of the router location comprises:
    i. determining an average number of interfaces [P], averaged over a plurality of customers, needed to operate the communications network for a customer at the router location;
    ii. determining a quantity of interfaces [B] available on a router at the router location;
    iii. determining an average amount of VPN resources [F], averaged over the defined group of customers, needed to operate the communications network for the customer at the router location;

iv. determining an amount of VPN resources [R] available on the router;
v. dividing [B] by [P], forming an interface ratio [IR]; and
vi. dividing [R] by [F] forming a VPN resource ratio [VR]; and if [IR] is greater than [VR], then forming the VPN resource constrained router network and if [VR] is greater than [IR] then forming the interface constrained router network.

3. The method of claim 2, wherein the determining the average number of interfaces needed to operate the communications network for the customer is determined by using existing customer data at the router location.

4. The method of claim 2, wherein the determining the average amount of VPN resources needed to operate the communications network for the customer is determined by using existing customer data at the router location.

5. The method of claim 2, wherein the average number of interfaces [P] needed in a router location is from 1 to 50 BGP sessions.

6. The method of claim 2, wherein the average amount of VPN resources needed to operate the communications network is from 10 to 10,000 routes.

7. The method of claim 2, wherein the quantity of interfaces [B] is from 500 to 3000 BGP sessions.

8. The method of claim 2, wherein the VPN resource is from 100,000 to 1,000,000 routes.

* * * * *